United States Patent
Suzuki et al.

(10) Patent No.: US 7,347,631 B2
(45) Date of Patent: Mar. 25, 2008

(54) OPTICAL POWER MONITOR

(75) Inventors: Masaru Suzuki, Mohka (JP); Yoshiaki Uchida, Mohka (JP); Shinji Furuichi, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/674,399

(22) Filed: Feb. 13, 2007

(65) Prior Publication Data

US 2007/0196057 A1    Aug. 23, 2007

(30) Foreign Application Priority Data

Feb. 21, 2006    (JP)    ............... 2006-043666

(51) Int. Cl.
G02B 6/26    (2006.01)
G02B 6/32    (2006.01)
G02B 6/36    (2006.01)
G02B 6/42    (2006.01)

(52) U.S. Cl. ..................... 385/88; 385/15; 385/31; 385/33; 385/34; 385/39; 385/53; 385/92; 385/93; 385/94

(58) Field of Classification Search .......... 385/88, 385/15, 31, 33, 34, 39, 53, 92–94
See application file for complete search history.

(56) References Cited

U.S. PATENT DOCUMENTS 6,785,441 B2 *    8/2004    Ooyama et al. .............. 385/34

2004/0258369 A1    12/2004    Luo et al.

FOREIGN PATENT DOCUMENTS

| DE | 39 10 166 A1 | 10/1990 |
|---|---|---|
| EP | 0 856 758 A2 | 8/1998 |
| EP | 1 219 990 A1 | 7/2002 |
| JP | 05343709 | 12/1993 |
| JP | 10511476 | 4/1998 |
| JP | 2001013362 | 1/2001 |

* cited by examiner

Primary Examiner—Frank G. Font
Assistant Examiner—Jerry Martin Blevins
(74) Attorney, Agent, or Firm—Sughrue Mion, PLLC

(57) ABSTRACT

An optical power monitor having a reduced number of component parts, easy to assemble, capable of facilitating positioning for achieving improved optical coupling, and having a reduced size and a reduced manufacturing cost. A pigtail fiber in which the center axis of an optical fiber is shifted from the center axis of the columnar capillary by 0.020 to 0.150 mm is used. The pigtail fiber and a photo diode are provided in a cylindrical tube with the pigtail fiber center axis and the photo diode center axis aligned with each other. The pigtail fiber and the photo diode can be adjusted to the optimum position in the cylindrical tube by adjustment in the longitudinal direction, thus advantageously simplifying the adjustment process in comparison with that in the conventional optical power monitor in which adjustments by movement in the radial direction, movement in the longitudinal direction and rotation about the center axis are made.

4 Claims, 4 Drawing Sheets

OPTICAL POWER MONITOR

BACKGROUND OF THE INVENTION

1. Field of the Invention

The present invention relates to an optical power monitor for measuring the intensity or energy of light in an optical fiber.

2. Description of the Related Art

With the rapid proliferation of the Internet, remarkable technical and quantitative developments have been made in the optical fiber communication market and optical communication networks are still presently being increased. With the increase in use of wavelength multiplex communication systems as one of large-capacity communication means, a need has arisen to handle several ten to several hundred wavelengths per system. There is a need to measure and monitor each of the energy of light of different wavelengths in operating a wavelength multiplex communication system. An optical power monitor is used for this purpose. A multiplicity of optical power monitors are used in a wavelength multiplex communication system. There is, therefore., a demand for reducing the size and price of optical power monitors.

In the optical power monitor most frequently used presently, an optical signal coming out of an optical fiber is received by a photo diode to be taken out as an electrical signal.

In an optical power monitor shown in section in FIG. 5A, a pigtail fiber 32 is used which is assembled by inserting an optical fiber 35 in a through-hole formed in a columnar capillary 34 along the center axis of the columnar capillary 34 so that the center axis of the columnar capillary 34 and the center axis of the optical fiber 35 coincide with each other. The pigtail fiber 32 and a photo diode 3 with a lens are fixed coaxially with each other in a cylindrical tube 6 so that a light emission side end surface 37 of the pigtail fiber 32 and the lens provided on the photo diode 3 are opposed to each other through a certain spacing set therebetween. As indicated by the arrow in the figure, an optical signal emitted from an open end surface of the optical fiber 35 into the space between the optical fiber open end surface and the lens provided on the photo diode 3 enters a light receiving portion 9 via the vertex 8 of the lens provided on the photo diode 3 to be converted into an electrical signal. In this optical power monitor, the open end surface of the optical fiber 35 is perpendicular to the center axis of the optical fiber 35. Therefore, part of the optical signal is reflected by the open end surface of the optical fiber 35 to travel in the reverse direction in the optical fiber and interfere with the optical signal traveling forward, thus causing reflection loss.

To reduce reflection loss, a method has been practiced in which, as described in Japanese Patent Laid-Open No. 2001-13362 or in the published Japanese translation No. 10-511476 of a PCT application, the light emission side end surface of a pigtail fiber is inclined through a certain angle (e.g., about 4 to 10 degrees) from the center axis of the pigtail fiber to have this angle with respect to the center axis. FIG. 5B shows in section an optical power monitor in which a light emission side end surface 47 of a pigtail fiber is set at a certain angle with respect to the center axis of the pigtail fiber. The reflection loss of an optical signal can be reduced setting the open end surface of the optical fiber at a certain angle from the center axis of the optical fiber. In the case where the optical fiber open end surface is inclined with respect to the center axis, however, the optical signal radiated from the optical fiber open end surface into the space between the optical fiber open end surface and the lens is bent through a certain angle with respect to the center axis of the optical fiber. Accordingly, the radiated optical signal enters the light receiving portion 9 by traveling via a position deviating from the lens vertex 8. When the optical signal enters the light receiving portion 9 via a position deviating from the lens vertex 8, the signal output from the light receiving portion 9 is reduced and the linearity of the sensitivity of the light receiving portion 9 is also reduced. If strong light strikes an end of the light receiving portion 9, a reverse current is generated and the sensitivity is further reduced.

A method using an arrangement in which as shown in section in FIG. 5C the center axis of a pigtail fiber 52 and the center axis of a photo diode 3 are shifted from each other to enable light radiated from the optical fiber open end surface to enter a light receiving portion 9 by traveling via a lens vertex 8 has been practiced. Shifting the center axes in such a manner requires using a cylindrical tube 56 having an inside diameter larger than that of the cylindrical tube 6 shown in FIG. 5A or 5B. Positioning of the pigtail fiber 52 and the photo diode 3 at the time of fixing by bonding in the tube 56 having an inside diameter sufficiently larger than the outside diameters of the pigtail fiber and the photo diode is considerably difficult to perform.

As a structure in which a pigtail fiber and a photo diode can be easily bonded and fixed while shifting the center axes of the pigtail fiber and the photo diode, a pigtail-type optical module in which the center axis of a pigtail fiber and the position of an optical element are shifted from each other is disclosed in Japanese Patent Laid-Open No. 5-34370. FIG. 6 is a sectional view of the pigtail-type optical module 60 disclosed in this document. A pigtail fiber 67 is bonded and fixed in a generally cylindrical sleeve 62, with their center axes aligned with each other. An optical element 68 having a spherical lens 63 is bonded and fixed in a generally cylindrical holder 61, with their center axes aligned with each other. The center axis of sleeve 62 is fixed eccentrically to the center axis of the holder 61 so that light coming out of the optical element 68 via the lens vertex 69 of the spherical lens 63 travels along the center axis of the pigtail fiber 67. A ferrule 66 (also called a capillary) is coaxial with an optical fiber 65.

The structure of the pigtail-type optical module 60 shown in FIG. 6 will be briefly described. The construction of the pigtail-type optical module 60 shown in FIG. 6 is the same as that of each of the optical power monitors shown in FIGS. 5A to 5C, although the direction of travel of light is reverse to that in the optical power monitors shown in FIGS. 5A to 5C. Light coming out of a light emitting element 64 passes through the spherical lens 63 and enters the optical fiber 65. The light emitting element 64 is provided eccentrically to the center axis of the optical element 68 to collect light coming out of the light emitting element 64 on the lens vertex 69 of the spherical lens 63 existing on the center axis of the optical element 68. To introduce light coming out of the lens vertex 69 into the optical fiber 65, the sleeve 62 in which the pigtail fiber is held and the holder 61 are fixed at an optimum relative position after shifting the sleeve 62 along the X-direction. There is also a need to adjust the pigtail fiber 67 along the Z-direction and along the φ-direction with respect to the optical element 68.

The structure shown in FIG. 6 ensures that light coming out of the spherical lens 63 can be led to the optical fiber 65 with reliability. If this configuration is applied to an optical power monitor, light coming out of an optical fiber can be led to a lens vertex with reliability. Positioning is remarkably easier in the structure shown in FIG. 6 than in the optical power monitor shown in FIG. 5C. The structure shown in FIG. 6, however, requires preparing two kinds of sleeve, i.e., the sleeve 62 and the holder 61. This means difficulty in reducing the size and cost. Moreover, it is necessary to adjust the pigtail fiber 67 along the X—, Z—, and φ-directions with respect to the holder 61.

SUMMARY OF THE INVENTION

An object of the present invention is to provide an optical power monitor having a reduced number of component parts, easy to assemble, capable of facilitating positioning for achieving improved optical coupling, and having a reduced size and a reduced manufacturing cost.

An optical power monitor according to the present invention has: a pigtail fiber composed of a columnar capillary having a light emission side end surface at a certain angle to a center axis of the capillary at an end of the capillary, and an optical fiber which is inserted and fixed in a through hole extending from the other end of the capillary to the light emission side end surface parallel to the center axis, and which has an open end surface forming a plane with the light emission side end surface on the light emission side end surface; and a photo diode with a lens which lens is disposed coaxially with the capillary so that the lens faces the light emission side end surface through a space of a predetermined length between a tip of the lens and the optical fiber open end surface. The optical fiber open end surface is shifted from the center axis in the direction that increases the distance between the optical fiber open end surface and the lens tip relative to the distance between a center of the light emission side end surface and the lens tip on a line of intersection between the light emission side end surface and a plane having thereon a perpendicular to the light emission side end surface and the center axis, and an optical signal emitted from the optical fiber open end surface into the space between the optical fiber open end surface and the lens tip irradiates the lens tip.

Preferably, in the optical power monitor of the present invention, the perpendicular to the light emission side end surface of the capillary is at an angle of about 4 to 10 degrees to the center axis. Further preferably, the optical fiber open end surface is shifted by 0.020 to 0.150 mm from the center axis in the direction that increases the distance between the optical fiber open end surface and the lens tip relative to the distance between the center of the light emission side end surface and the lens tip on the line of intersection between the light emission side end surface and the plane having thereon the perpendicular to the light emission side end surface and the center axis.

In the optical power monitor of the present invention, the optical fiber open end surface is inclined with respect to the center axis. Therefore, an optical signal emitted from the optical fiber open end surface is bent in the direction that reduces the distance between the lens tip and the optical fiber open end surface, i.e., the direction toward the capillary center axis, to travel through the space between the lens tip and the optical fiber open end surface. Since the optical fiber open end surface is shifted from the center axis in the direction that increases the distance between the optical fiber open end surface and the lens tip relative to the distance between the center of the light emission side end surface and the lens tip on the line of intersection between the light emission side end surface and the plane having thereon the perpendicular to the light emission side end surface and the center axis, the optical signal emitted from the optical fiber open end surface into the space between the optical fiber open end surface and the lens tip irradiates the lens tip and enters the photo diode via the lens. "Lens vertex" used in this specification is not a physical vertex but a point via which light passed through the lens reaches a substantially central point in the light receiving portion of the photo diode, and is used as a term synonymous with "lens vertex region".

The optical fiber extending in the capillary to the capillary light emission side end surface parallel to the center axis of the capillary is shifted from the center axis of the capillary. Therefore, the pigtail fiber and the photo diode with the lens can be set coaxial with each other by being put in a cylindrical tube, and the optical fiber open end surface can be easily positioned by being placed eccentrically from the lens tip on the photo diode. Alignment between the center axis of the pigtail fiber and the center axis of the photo diode with the lens permits a clearance approximately equal to a margin for fitting between the inside diameter of the cylindrical tube and the outside diameter of the pigtail fiber and a margin for fitting between the inside diameter of the cylindrical tube and the outside diameter of the photo diode.

To assemble the optical power monitor of the present invention, a pigtail fiber is prepared which is composed of a capillary having a light emission side end surface at a certain angle to a center axis of the capillary at an end of the capillary, and an optical fiber which is inserted and fixed in a through-hole extending from the other end of the capillary to the light emission side end surface parallel to the center axis, and which has an open end surface forming a plane with the light emission side end surface flush with the light emission side end surface on the light emission side end surface. The optical fiber open end surface is provided at such a position on the light emission side end surface of the capillary that the distance between the optical fiber open end surface and an apex at which a line of intersection between the light emission side end surface and a plane having thereon a perpendicular to the light emission side end surface and the center axis forms an acute angle with a capillary external line is larger than the distance between the center line and the apex. A photo diode with a lens is also prepared. A cylindrical tube having a through-hole in which the pigtail fiber and the photo diode with a lens can be inserted is further prepared separately. The pigtail fiber and the photo diode with a lens are inserted in the cylindrical tube so that the light emission side end surface of the capillary and the lens provided on the photo diode face each other. The intensity of light signal input through the optical fiber is measured as the output from the photo diode with the lens while adjusting the distance between the pigtail fiber and the photo diode. The pigtail fiber and the photo diode with the lens are fixed at a most suitable position by bonding in the cylindrical tube.

The most suitable position is, for example, a position at which the indication on a measuring device is maximized, when light having a wavelength of 1550 nm is input from the optical fiber and the output is measured by the photo diode. When the pigtail fiber and the photo diode with the lens are set at the position, light from the optical fiber enters the photo diode by traveling via the lens vertex. Since the optical fiber open end surface is shifted by h from the center axis of the pigtail fiber, there is no need to move the optical fiber in the radial direction of the cylindrical tube. Since the center axes of the pigtail fiber and the photo diode are aligned with each other in advance by cylindrical tube, there is also no need to find the point at which the indication value is maximized by rotating the pigtail fiber. After the optimum position of the pigtail fiber has been found, the cylindrical tube and the pigtail fiber are temporarily fixed or fixed with a jig in the cylindrical tube. After this operation, inputting of light is stopped and the measuring device is removed. Thereafter, an adhesive is applied and thermally set. Light-shielding processing such as covering with a light-shielding thermally shrinkable tube is performed to complete the optical power monitor.

Thus, the center axes of the pigtail fiber and the photo diode with the lens can be easily aligned with each other only by inserting, bonding and fixing these components in the inside-diameter portion of the cylindrical tube. The center axis of the optical fiber can also be shifted easily from the center axis of the capillary in this way. Thus, the facility with which the optical power monitor is assembled is improved.

If the light emission side end surface of the columnar capillary, i.e., the optical fiber open end surface, is at an angle $\theta$ with respect to the center axis, and if the optical signal radiated from the optical fiber open end surface is bent through an angle $\theta 2$ with respect to the center axis, an equation shown below is established between the refractive index n Of the optical fiber and the angles $\theta$ and $\theta 2$.

$$n=\sin(\theta+\theta 2)/\sin(\theta)$$

If the angle $\theta$ formed by the optical fiber open end surface with respect to the center axis is about 4 to 10 degrees, optical reflection at the end surface can bee prevented. From the above equation, the angle $\theta 2$ formed by the optical signal with respect to the center axis is generally in a relationship expressed by $\theta/1.45$. If the angle $\theta$ is reduced, the angle $\theta 2$ through which the optical signal is bent is reduced.

Let the distance between the optical fiber open end surface and the tip of the lens provided on the photo diode be L (mm). As a condition for irradiation of the tip of the lens provided on the photo diode with the optical signal radiated from the optical fiber open end surface, the following equation of the shift h (mm) from the optical fiber open end surface from the center axis (the columnar capillary and the lens provided on the photo diode being coaxial with each other) must be satisfied:

$$h=L\cdot\tan\{\sin^{-1}(n\cdot\sin\theta)\cdot\theta\}$$

From this equation, it can be understood that when the angle $\theta$ formed by the optical fiber open end surface with respect to the center axis is increased in the range from about 4 to 10 degrees, it is necessary to increase the shift h. If the shift h is set to a value between 0.020 to 0.150 mm in the range from 4 to 10 degrees, the distance L between the optical fiber open end surface and the tip of the lens provided on the photo diode can be reduced to 1.00 mm or less.

The lower limit 0.020 mm of the shift h is necessary for absorption of the above-mentioned clearance for fitting between the inside diameter of the cylindrical tube and the outside diameter of the pigtail fiber. The upper limit 0.150 mm of the shift h is necessary for a reduction in size. Also, prevention of damage to the optical fiber during the operation for covering the external surface of the optical power monitor with a light-shielding thermally shrinkable tube requires setting the shift h to a value smaller than the upper limit value. If the shift h is increased, the thermally shrinkable tube cannot be uniformly shrunken when thermally shrunken while covering the optical power monitor. In such a situation, there is a risk of the optical fiber being broken.

Preferably, resins used for the cylindrical tube, the columnar capillary and bonding are light-shielding materials. If the cylindrical tube is formed of a light-transmissive material, light enters the photo diode through the cylindrical tube to generate noise. Preferably, the cylindrical tube is formed of ceramic or glass from the consideration of the relationship between the cylindrical tube and the columnar capillary in terms of thermal expansion coefficient and workability. Further, it is preferable to form the columnar capillary of ceramic or glass. The outer jacket material for the photo diode is ordinarily constituted of a metal and, therefore, there is no light-shielding problem with the outer jacket material. Even in a case where the cylindrical tube and the columnar capillary are formed of light-shielding materials, there is a possibility of light entering these components if the resin for bonding these components is light-transmissive. It is, therefore, preferable to use a resin having low-light-transmissivity. In a case where a light-transmissive cylindrical tube or columnar capillary is used, blocking of external light can be effectively performed by covering the cylindrical tube, the columnar capillary and the photo diode with a light-shielding thermally shrinkable tube and by shrinking the thermally shrinkable tube. A coating or the like having a light-shielding effect may be applied instead of the thermally shrinkable tube.

An optical antireflection film may be formed on the inclined end surfaces of the optical fiber and the columnar capillary to further reduce the reflection loss. As the optical antireflection film, a dielectric multilayer film formed by alternately laminating thin film of a low-refractive-index material such as silicon oxide ($SiO_2$) or a tantalum oxide ($Ta_2O_5$) and thin film of a high-refractive-index material such as titanium oxide ($TiO_2$) by vacuum deposition for example may be used. The reflection loss can be obtained from the energy of incident light P1 and the energy of light P2 reflected and returned by the end surface. The reflection loss is computed by $-10\log_{10}P1/P2$ (dB). In a case where the angle of inclination of the optical fiber and the capillary end surface is 8 degrees, the reflection loss when no optical antireflection film is provided is about $-70$ dB, and the reflection loss when an optical antireflection film is provided is about $-80$ dB or less. Thus, the provision of an optical antireflection film ensures that the reflection loss is reduced by 10 dB or more.

A pigtail fiber having two optical fibers, used in a bidirectional optical power monitor may also be used. The optical fiber close to the photo diode with a lens in the two optical fibers provided in the inclined surface is used by being cut in the capillary end surface opposite from the inclined surface. It is necessary to perform light-shielding processing for preventing external light form entering through the optical fiber cut surface. However, enabling use of the pigtail fiber used in the bidirectional optical fiber has the effect of reducing the number of kinds of component parts in the entire optical communication device. Also, a pigtail fiber having the cut-side optical fiber broken during manufacture of the bidirectional optical monitor may be used in the optical power monitor of the present invention. This can contribute to a reduction in manufacturing cost.

Use of the pigtail fiber in which the center axis of an optical fiber is shifted from the center axis of a capillary ensures that the pigtail fiber and a photo diode can be held by only one type of cylindrical tube. While only one type of cylindrical tube is used, optical axis adjustment of the pigtail fiber and the photo diode is performed only in the longitudinal direction. Thus, the adjustment process is advantageously simplified in comparison with that in the conventional optical power monitor in which adjustments by movement in the radial direction, movement in the longitudinal direction and rotation about the center axis are made.

The number of manufacturing steps is thereby reduced to make it possible to provide a low-priced optical power monitor.

DETAILED DESCRIPTION OF THE PREFERRED EMBODIMENTS

Figure 1:
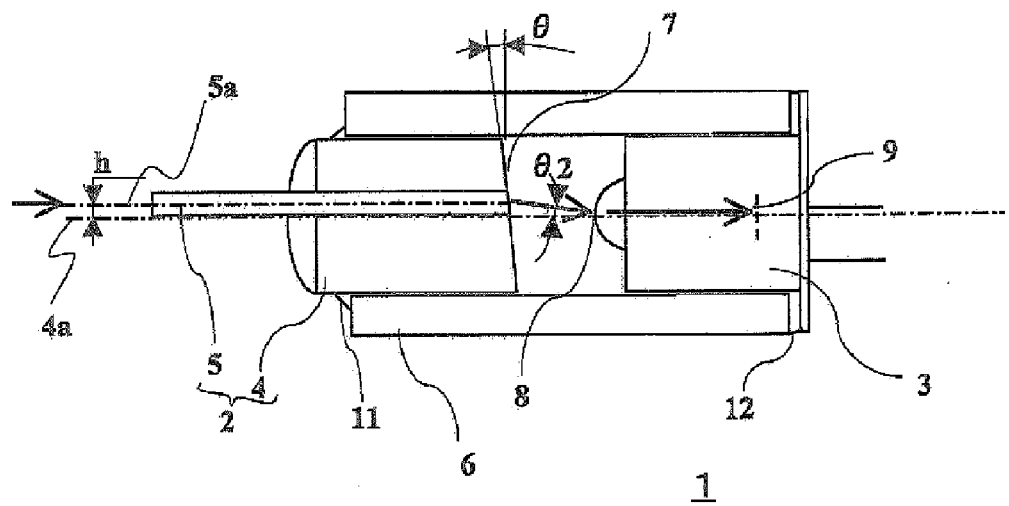
FIG. 1 is a sectional view of an optical power monitor according to the first embodiment of the present invention.

The present invention will be described in detail with respects to embodiments thereof with reference to the accompanying drawings. For ease of description, components or portions identical to each other are indicated by the same reference characters.

EXAMPLE 1

Figure 2:
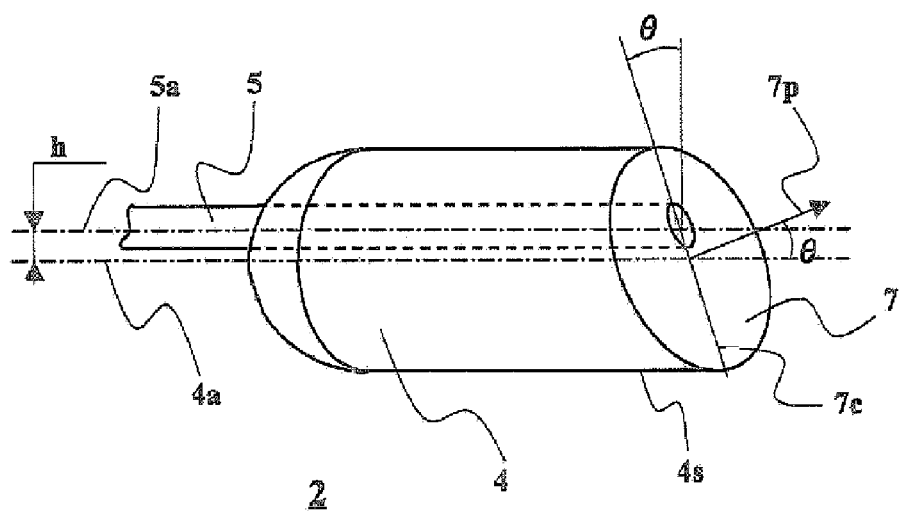
FIG. 2 is a perspective view of a pigtail fiber used in the optical power monitor of the present invention.
Figure 3A:
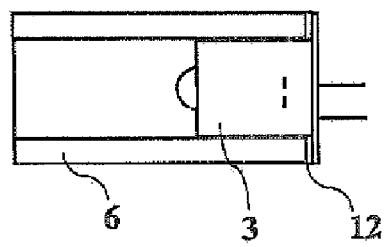
FIGS. 3A to 3C are diagrams for explaining the process of assembling the optical power monitor of the present invention.

Detailed description of embodiments of the present invention, including a description of the structure of an optical power monitor in accordance with the present invention and a description of a method of assembling the optical power monitor, will be made. FIG. 1 is a sectional view of the structure of an optical power monitor according to the first embodiment of the present invention. FIG. 2 is a perspective view of a pigtail fiber. FIGS. 3A to 3O shows the process of assembling the optical power monitor.

Referring to FIG. 1, an optical power monitor 1 in accordance with the present invention has a pigtail fiber 2 and a photo diode 3 with a lens provided in a through-hole in a cylindrical tube 6 so that a light emission side end surface 7 of a columnar capillary 4 and the lens provided on the photo diode 3 are opposed to each other through a space of a predetermined length. The pigtail fiber 2 is formed by the columnar capillary 4 and an optical fiber 5. Referring to the perspective view of the pigtail fiber 2 shown in FIG. 2, the light emission side end surface 7 at one end of the columnar capillary 4 has an angle θ with respect to a center axis 4a of the columnar capillary 4. That is, a perpendicular 7p to the light emission side end surface 7 has an angle θ with respect to the center axis 4a of the columnar capillary 4. The angle θ is about 9 degrees. In the columnar capillary 4, a through-hole having a center axis spaced by a distance h from the center axis 4a of the columnar capillary 4 extends to the light emission side end surface 7 parallel to the center axis 4a, and the optical fiber 5 is inserted and fixed in the through-hole. The light emission side end surface 7 of the columnar capillary 4 and the open end surface of the optical fiber 5 are worked so as to flush with each other. Therefore the open end surface of the optical fiber 5 has an inclination angle θ to the perpendicular section of the columnar capillary 4. Since the perpendicular 7p to the end surface has the same angle θ to the center axis 4a of the columnar capillary and to an optical fiber center axis 5a, the angle of the end surface is expressed by the angle between the perpendicular 7p to the end surface and the center axes as occasion demands in the description of the present invention. The optical fiber open end surface is shifted by h from the center axis 4a in the direction that increases the distance between the optical fiber open end surface and the lens tip 8 relative to the distance between a center of the light emission side end surface 7 and the lens tip 8, i.e., an upward direction as viewed in FIGS. 1 and 2, on a line 7c of intersection between the light emission side end surface 7 and a plane having thereon the perpendicular 7p to the light emission side end surface 7 and the center axis 4a. The center axis 5a of the optical fiber is positioned at a position on the inclined surface shifted in the direction that increases the distance between the end surface 7 and the photo diode opposed to each other. Referring to FIG. 2, the intersection line 7c forms an acute angle from a lower external line 4s on the columnar capillary 4. Then it can be said that the optical fiber open end surface is provided at a position shifted by h in the direction that increases the distance between the apex corresponding to the acute angle and the optical fiber center axis 5a relative to the distance between the apex and the columnar capillary center axis 4a.

In this embodiment, the shift h of the optical fiber center axis 5a from the columnar capillary center axis 4a was 0.0625 mm. The columnar capillary 4 was made of a light-transmissive glass. The columnar capillary 4 had an outside diameter of 1.80 mm and a length of 5.3 mm. Light coming out of the optical fiber open end surface was emitted at an angle of θ2 (about 6.2 degrees) with respect to the optical fiber center axis. 5a. The distance between the optical fiber end surface and the vertex 8 of the lens provided on the photo diode 3 was 0.58 mm. The distance between the lens vertex 8 and the light receiving portion 9 of the photo diode 3 with the lens was 1.4 mm and the diameter of the light receiving portion 9 was 0.3 mm. The cylindrical tube 6 having an outside diameter of 3.5 mm, an inside diameter of 1.83 mm and a length of 7.0 mm was made of white zirconia ceramic. The outside diameter of the photo diode was 1.78 mm. The pigtail fiber 2 and the photo diode 3 with the lens were respectively bonded to the cylindrical tube inner surface by epoxy resins 11 and 12.

Figure 3B:
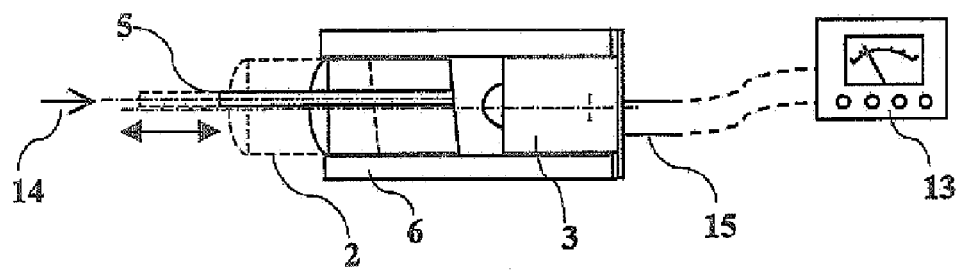
Figure 3C:
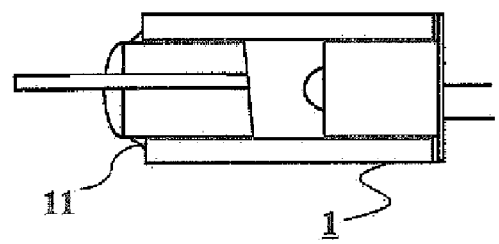

The process of assembling the optical power monitor 1 will be described with reference to FIGS. 3A to 3C. Referring to FIG. 3A, the photo diode 3 with the lens is inserted in the inner hole of the cylindrical tube 6 and fixed in the same by bonding with epoxy adhesive 12. Since the inside diameter of the cylindrical tube 6 is 1.83 mm and the outside diameter of the photo diode with the lens is 1.78 mm, a clearance of 0.05 mm exists therebetween. Accordingly, the shift between the center axis of the cylindrical tube and the center axis of the photo diode is 0.025 mm at the maximum. However, this value is sufficiently smaller than the diameter 0.3 mm of the light receiving portion. Therefore, there is no problem with the clearance about the above-mentioned value. As shown in FIG. 3B, a measuring device 13 for measuring the current output from the photo diode 3 with the lens was connected to output terminals 15 of the photo diode. The pigtail fiber 2 was then inserted through the open end of the cylindrical tube 6 and input light 14 having a wavelength of 1550 nm was input to the optical fiber 5. Since a clearance of 0.03 mm exists between the cylindrical tube 6 and the pigtail fiber 2 due to the inside diameter 18.3 mm of the cylindrical tube and the outside diameter 1.80 mm of the pigtail fiber 2, the pigtail fiber can be freely moved in the cylindrical tube in the longitudinal direction (the direction of the arrow) while being prevented from moving by any substantial amount in the radial direction of the cylindrical tube. The pigtail fiber 2 was moved in the directions of the arrows and the pigtail fiber was temporarily fixed in the cylindrical tube at a position at which the indication on the measuring device 13 was maximized. The input light 14 and the measuring device 13 were removed and the pigtail fiber and the cylindrical tube were fixed by bonding with epoxy adhesive 11, thereby obtaining the optical power monitor 1 (see FIG. 5C). While application and setting of adhesives 11 and 12 in different steps have been described, the step of applying and setting adhesive 12, described with reference to FIG. 3A, can be performed simultaneously with the step shown in FIG. 3C by temporarily fixing the photo diode 3 with the lens in the cylindrical tube. A step of attaching a light-shielding thermally shrinkable tube, not shown in FIG. 3, is performed to cover the photo diode with the lens, the cylindrical tube and the pigtail fiber.

Figure 5A:
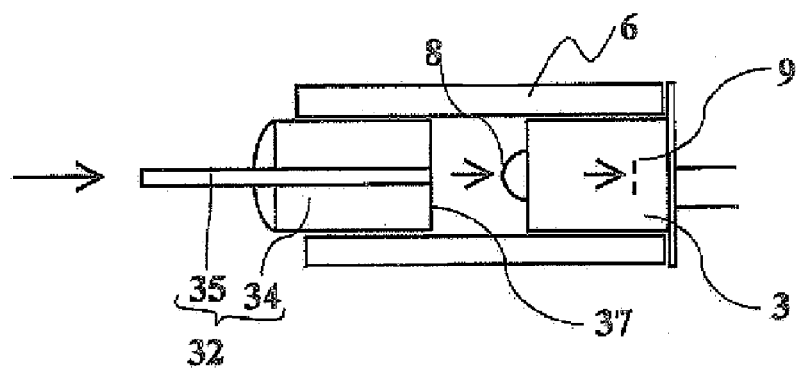
FIGS. 5A to 5C are sectional views of conventional optical power monitors.
Figure 5B:
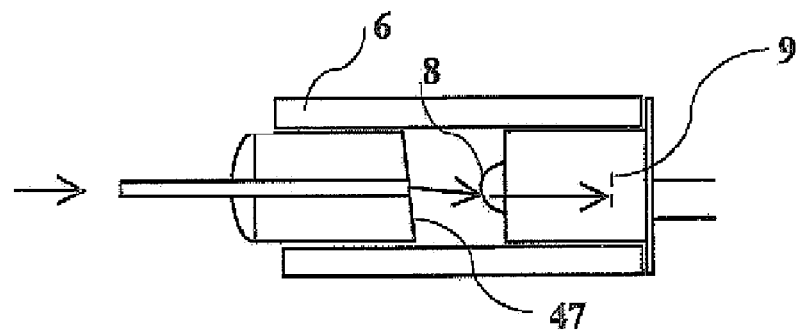
Figure 5C:
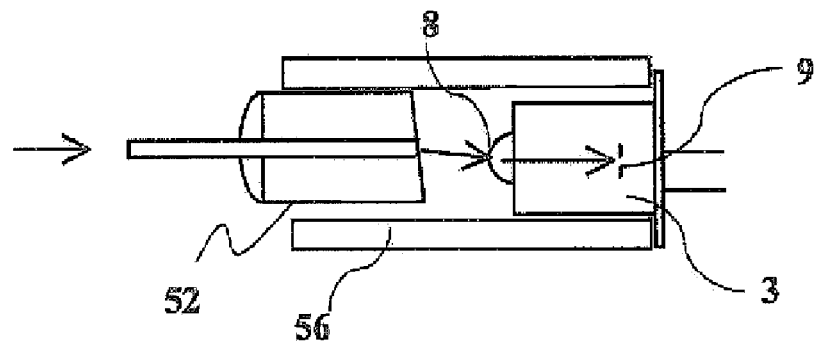
Figure 6:
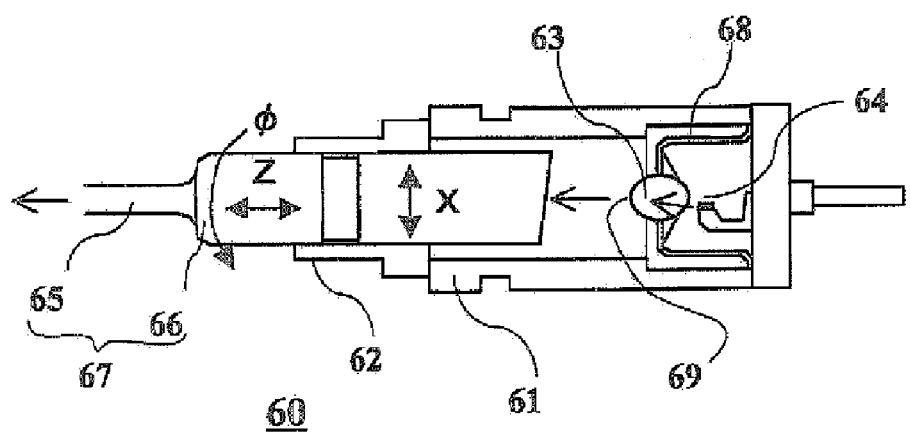
FIG. 6 is a sectional view of a conventional pigtail-type optical module.

In the conventional optical power monitor using the large-diameter cylindrical tube shown in FIG. 5C, there is a need to move the pigtail fiber in the cylindrical tube in the radial and longitudinal directions of the cylindrical tube and to obtain the optimum position of the pigtail fiber through rotation about the center axis. In contrast, in the optical power monitor of the present invention, the optimum position can be determined only through positioning in the longitudinal direction, so that the time taken to perform the operation for obtaining the optimum position can be reduced to about ⅒ of the time taken to perform the corresponding operation in the conventional art.

EXAMPLE 2

Figure 4:
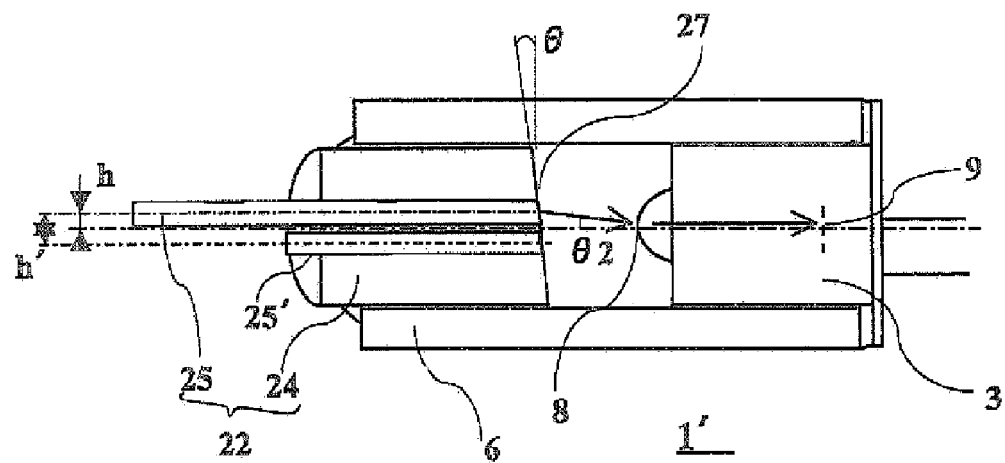
FIG. 4 is a sectional view of another optical power monitor of the present invention.
Figure 7:
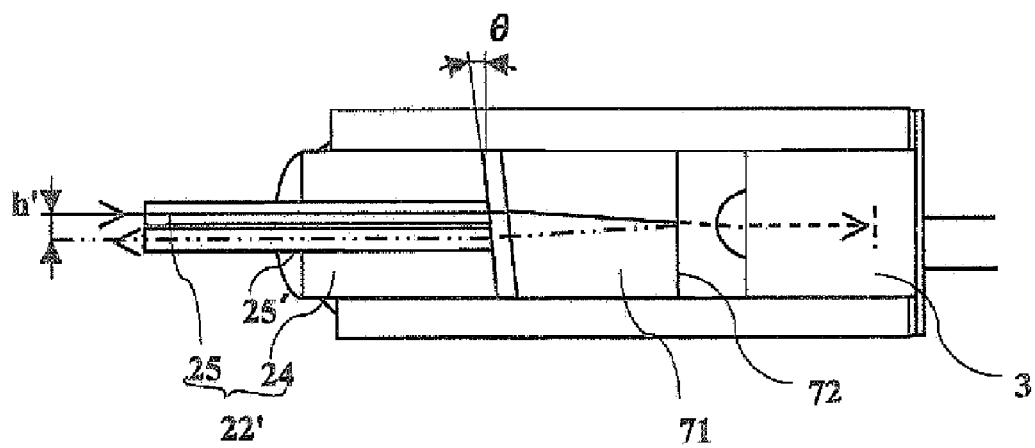
FIG. 7 is a sectional view of a conventional bidirectional optical power monitor.

FIG. 4 is a sectional view of an optical power monitor 1' according to the second embodiment of the present invention. In this embodiment, a pigtail fiber 22' having two optical fibers for use in a bi-directional optical power monitor 70 shown in FIG. 7 is used. The structure of the bidirectional optical power monitor 70 is such that a GRIN lens 71 with a tap film 72 is provided between the pigtail fiber and the photo diode with a lens in the above-described optical power monitor according to the first embodiment of the present invention. Light entering the optical power monitor through one optical fiber 25 in the two optical fibers 25 and 25' is separated into reflected light (indicated by the double-dot-dash line) and transmitted light (indicated by the broken line) at the tap film 72 of the GRIN lens 71. The transmitted light enters the photo diode 3 to become an electrical signal, while the reflected light returns to the GRIN lens 71 and enters the other optical fiber 25' to become output light from the optical fiber 25'. Conversely, reflected light obtained from light entering the optical power monitor through the other optical fiber 25' becomes output light from the optical fiber 25, while transmitted light enters the photo diode 3 to become an electrical signal. While the bi-directional optical power monitor 70 takes out part of the light in the optical fiber and measures the energy of the light taken out, the optical power monitor of the present invention takes out whole of the light in the optical fiber and measures the energy of light taken out.

As shown in FIG. 4, the distance h' between the two optical fibers 25 and 25' was 0.25 mm. The shift h corresponding to the distance between the center axis of the capillary 24 and the center axis of the optical fiber 25 used was 0.125 mm, about twice that in the first embodiment. The angle θ of inclination of an end surface 27 of a pigtail fiber 22 was 8 degrees. Since the angle of emergence of light from the optical fiber 25 is θ=5.5°, the distance between the pigtail fiber end surface and the lens vertex 8 was about 1.3 mm. The pigtail fiber was positioned so as to project by about 0.7 mm outward relative to that in the first embodiment. However, this difference about 0.7 mm was not particularly noticeable in the final product with a thermally shrinkable tube covering.

In the case where the pigtail fiber 22' used in the bi-directional optical power monitor 70 is used in the pigtail fiber 22 used in the optical power monitor of the present invention, a process step for light shielding processing on the optical fiber 25' terminal not used is added, but advantages described below can be enjoyed. A common component usable as the pigtail fibers in the bi-directional optical power monitor and the optical power monitor of the present invention is designed to reduce the number of kinds of component parts to be purchased. Also, the purchase price can be reduced because the number of the identical component parts to be purchased is increased. Conventionally, there is a need to discard an article having an optical fiber damaged in the process of manufacturing the bidirectional optical power monitor 70. Such an article, however, can be used in the optical power monitor of the present invention.

What is claimed is:

1. An optical power monitor comprising:
    a pig tail fiber composed of
        a columnar capillary having a light emission end surface at a certain angle to a plane perpendicular to a center axis of the capillary;
        a first optical fiber inserted and fixed in a through-hole of the capillary,
    wherein the first optical fiber is parallel to the center axis of the capillary, and has an end surface forming a plane with the light emission end surface;
    a second optical fiber inserted and fixed in a through hole of the capillary;
    a photo diode; and
    a lens disposed coaxially with the center axis of the capillary and with a space of a predetermined length between a tip of the lens and the first optical fiber end surface;
    wherein an optical axis of the first optical fiber is shifted from the center axis of the capillary in the direction that a distance from the first optical fiber end surface to the lens tip becomes greater, so that an optical signal emitted from the first optical fiber end surface irradiates the lens tip.

2. An optical power monitor as set forth in claim 1, wherein the light emission end surface of the capillary is at an angle of about 40° to 10 ° to the plane perpendicular to the center axis of the capillary.

3. An optical power monitor as set forth in claim 2, wherein the optical axis of the first optical fiber is shifted from the center axis of the capillary by 0.020 mm to 0.150 mm.

4. An optical power monitor as set forth in claim 1, wherein the second optical fiber is light-shielded.

* * * * *